United States Patent Office 2,993,646
Patented July 25, 1961

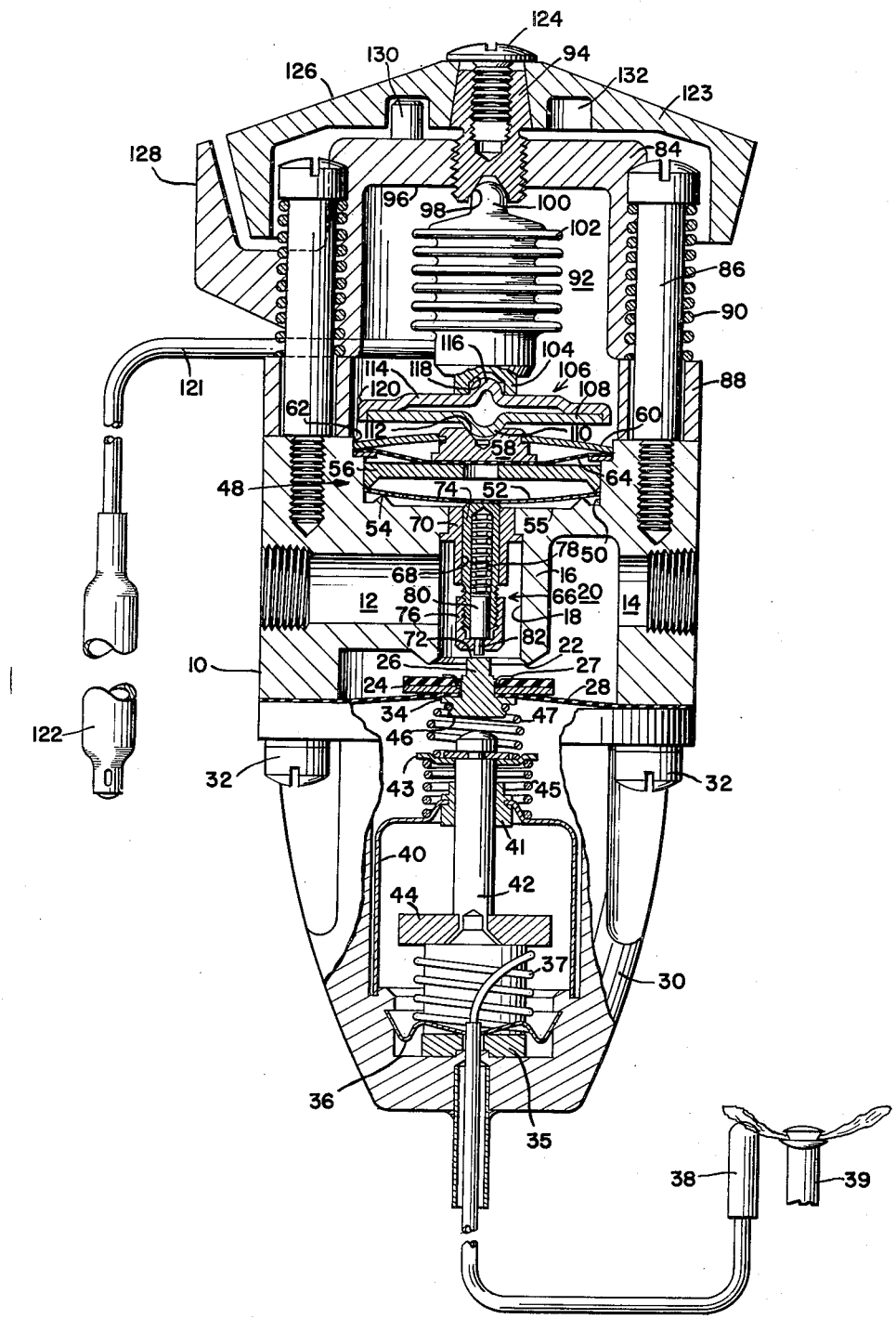

2,993,646
COMBINED TEMPERATURE REGULATOR AND FLAME FAILURE CONTROL
Wilbur F. Jackson and Theodore J. Dykzeul, Compton, Calif., assignors to Robertshaw-Fulton Controls Company, Richmond, Va., a corporation of Delaware
Filed Aug. 22, 1958, Ser. No. 756,590
2 Claims. (Cl. 236—9)

This invention relates generally to controls for gaseous fuel burners and more particularly to combination controls therefor wherein a flame failure cut-off and a thermostatically controlled snap-action mechanism operate on a single control valve.

The present invention is particularly adapted, though not limited, for use with space heaters and the like wherein the temperature in a space is to be maintained at a selected value. In such devices, it is well known to thermostatically control the flow of fuel to a burner so that when the selected space temperature has been reached, a snap-action mechanism, which is responsive to the movement of a thermally responsive means, moves through its overcenter position to abruptly move the control valve to shut off the flow of fuel to the burner. In order to minimize overheating of the space to be controlled, it is desirable that the snap-action mechanism have a follow-through movement so as to be moved through its overcenter position with a positive snap action.

It is an object of this invention to utilize a single valve member for thermostatically controlling fluid flow in response to the temperature in the space to be heated and for flame failure cut-off control.

Another object of this invention is to combine a flame failure control and a thermostatic fluid flow control into a simple, compact and reliable structure permitting economy in manufacture and facilitating installation and repair.

A further object of this invention is to insure positive snap-action of an overcenter snap-action mechanism which operates a control valve between the controlling positions thereof.

In a preferred embodiment of the invention, a control valve is provided with an inlet passage and an outlet passage with a valve seat therebetween. A control valve member is mounted for movement between an open and a closed position relative to said valve seat and is biased to the closed position. A thermally responsive means responsive to the temperature in the space to be controlled is operatively connected to one side of the valve member through a spring means and an overcenter snap-action mechanism.

The thermally responsive means has an element movable in response to variations in the temperature in the space to be heated which movement is transmitted to the snap-action mechanism through the spring means. The snap-action mechanism is constructed and arranged to maintain the valve member in its open position until a selected space temperature is reached, at which time the snap-action mechanism snaps overcenter whereby the valve member is moved to the closed position. The spring means is deflectable to a stressed condition as the snap-action mechanism moves to the overcenter position and transmits the spring load developed by this deflection to the snap-action mechanism as it passes through the overcenter position. A thermoelectric flame failure mechanism is operatively connected to the valve member at the side opposite to the thermally responsive means and is operative to close the valve member upon a pilot flame failure.

Other objects and advantages will become apparent from the following description taken in connection with the accompanying drawing in which the single figure is a sectional view of a control device embodying this invention.

Referring more particularly to the drawing, the control is shown as comprising a casing 10 having an inlet 12 and an outlet 14 which are adapted to be connected to a fuel supply and a fuel burner, respectively. Casing 10 is provided with a partition 16 intermediate inlet 12 and outlet 14. Partition 16 has a cylindrical cavity 18 therein providing communication between inlet 12 and a valve chamber 20 provided in casing 10 in communication with outlet 14. An annular valve seat 22 is formed on the outer end face of partition 16 to intersect cavity 18 and communicate with valve chamber 20.

An annular valve member 24 is mounted within valve chamber 20 for cooperation with valve seat 22 to control the flow of fuel between cavity 18 and valve chamber 20. Valve member 24 is secured to an axial valve stem 26 by retaining clip 27 and is guided for vertical movement by a flexible diaphragm 28 which encloses valve chamber 20. The outer edge of diaphragm 28 is clamped between casing 10 and a generally dome-shaped housing 30 which is secured to casing 10 by a plurality of bolts 32. The central portion of diaphragm 28 is clamped between the underside of valve member 22 and an outwardly extending flange 34 on valve stem 26.

A thermoelectric means is provided for moving valve member 24 to the closed position upon the occurrence of a condition as, for example, the failure of the pilot flame. Such means comprises a U-shaped magnet core 35 with the bight thereof secured to housing 30 by a retaining clip 36. Wound on each leg of magnet coil 35 is a coil 37 adapted to be energized by a thermoelectric generator, here shown as a thermocouple 38, positioned to be heated by a flame emanating from a pilot burner 39. A cup-shaped member 40 is supported in an inverted position on housing 30 to enclose magnet core 35. A bearing 41 is centrally mounted on the base of cup-shaped member 40 and has an armature stem 42 slidably mounted therein in axial alignment with valve stem 26. Armature stem 42 carries a collar 43 on one end thereof and armature 44 on the other end thereof which is engageable with the pole faces of magnet core 35. A spring 45 acting between collar 43 and member 40 serves to bias the assembly of the armature stem 42 and armature 44 away from the pole faces of magnet core 35 to a released position.

As is customary in thermoelectric devices of the type herein described, the magnetic attraction of the electromagnet 35, 37 is not of sufficient strength to move armature 44 from the released position to the attracted position against the bias of spring 45. However, this magnetic attraction is of sufficient strength to maintain armature 44 in engagement with the pole faces of magnet 35 after armature 44 has been moved to such position by the usual resetting operation.

In the released position, armature stem 42 engages the lower end 46 of valve stem 26 to hold valve member 24 in the closed position and thereby shut off fluid flow to outlet 14. It will be apparent that in order to move valve member 24 to the closed position when armature stem 42 is in the released position, spring 45 must be able to exert an upward force on valve stem 26 greater than any downward force concurrently exerted thereon.

Means are provided for biasing valve member 24 toward the closed position even when armature stem 42 is in the attracted position. To this end, a coil spring 47 is mounted in compression between the upper side of collar 43 and the underside of flange 34 on valve stem 26.

An overcenter snap-action mechanism, indicated generally by reference numeral 48, is mounted within a cylindrical recess 50 formed in casing 10. Snap-action mechanism 48 is of well known form and comprises a conventional clicker disc 52 supported on an annular knife-edged projection 54 formed on the base 55 of recess 50, a thrust member 56 supported on clicker disc 52 adjacent the periphery thereof, and a thrust button 58 supported on thrust member 56 and guided for vertical movement by retaining disc 60 which is pressed into a counterbore 62 adjacent recess 50.

As is well known, thrust button 58 is operable to transmit its movement to thrust member 56 which actuates clicker disc 52 between an inactive or relaxed position and an active position through an overcenter position. As snap-action devices of the type briefly described herein are well known, further description is deemed unnecessary except to point out that suitable provision is made, such as by gasket 64, for sealing such mechanism against the escape of fuel from casing 10.

Means are provided for transmitting to the valve member 24 the movement of clicker disc 52 between the operating positions thereof. To this end, a shaft means 66 is positioned for slidable movement within a vertical bore 68 in a guide plug 70 which is mounted in casing 10 to extend between cavity 18 and recess 50. Shaft means 66 is in axial alignment with valve stem 26 for engagement therewith at the upper end 72 thereof.

Shaft means 66 is comprised of a hollow upper member 74 extending into recess 50 for engagement with clicker disc 52 and a cup-shaped lower member 76 threadedly mounted on upper member 74. Hollow upper member 74 contains a spring 78 which serves to urge a plug 80 into contact with the underside of the base of cup-shaped lower member 76. Plug 80 has a reduced end 82 which extends through a bore in the base of cup-shaped lower member 76 for engagement with the upper end 72 of valve stem 26.

The length of shaft means 66 is adjusted so that when clicker disc 52 is in the inactive position, plug 80 engages valve stem 26 to hold valve member 24 in its open position against the bias of spring 47. It will thus be apparent that the strength of spring 78 must be greater than the strength of spring 47.

Thermally responsive means for operating valve member 24 through snap-action mechanism 48 is contained within a generally cup-shaped upper housing 84 which is mounted in an inverted position on casing 10 by a plurality of bolts 86 threaded into casing 10. Bolts 86 extend through bores in a plurality of flanges 88 formed on upper housing 84 and have springs 90 positioned in compression between the bolt heads thereof and flanges 88 whereby upper housing 84 is biased into engagement with casing 10.

Upper housing 84 defines an internal cavity 92 communicating with recess 50 and has a temperature adjusting plug 94 threadedly mounted in the base 96 thereof to extend into internal cavity 92 in axial alignment with thrust button 58. Temperature adjusting plug 94 has a central recess 98 therein for reception of the top end 100 of an expansible and contractible bellows 102 vertically mounted within internal cavity 92. Bellows 102 is supported at its bottom end 104 on a spring means 106 operatively engaged between bellows 102 and thrust button 58.

Spring means 106 is comprised of a resilient lower disc 108 having a central nipple 110 which projects from the underside thereof and is adapted to be received by a recess 112 in thrust button 58 and a resilient upper disc 114 supported on lower disc 108 and having a central dimple 116 which projects from the upper side thereof for reception by a recess 118 in the bottom end 104 of bellows 102. Upper disc 114 has a downwardly extending annular flange portion 120 at the periphery thereof for engagement with and reception of lower disc 108 whereby upper and lower discs 114 and 108 contact each other only at the peripheries thereof and are spaced from each other at the central portions thereof. This construction permits deflection of the peripheral portions of upper and lower discs 114 and 108 about their central fulcrums comprised of bottom end 104 and thrust button 58, respectively. Also, it will be apparent that spring means 106 serves as a universal connection to compensate for misalignment between bellows 102 and thrust button 58.

Bellows 102 contains a suitable thermally responsive fluid and connects, through a capillary tube 121, with a temperature sensing bulb 122 positioned in the space where the temperature is to be controlled. Since top end 100 of bellows 102 is confined against movement by plug 94, bottom end 104 is movable in accordance with bellows expansion and contraction in response to bulb temperature variations. The vertical movement of bottom end 104 is transmitted to thrust button 58 through spring means 106.

Means are provided for adjusting the control temperature. Such means takes the form of a temperature setting dial 123 frictionally locked to temperature adjusting plug 94 for rotation therewith by means of a screw 124 threadedly engaging temperature adjusting plug 94 at the upper end thereof which extends outwardly of housing 84. Temperature adjustment is obtained by rotation of dial 123 which causes a corresponding rotation and vertical movement of temperature adjusting plug 94. Vertical adjustment of plug 94 varies the gap between the bellows bearings, i.e., plug 94 and spring means 106, thereby varying the amount of bellows movement required to actuate snap-action mechanism 48 to the active position thereof at which time the flow of fuel is shut off as was previously described. In this manner, the control temperature at which the flow of fuel is cut off may be selected by rotation of the temperature adjusting dial to a particular setting.

The inclined face 126 of temperature dial 123 is provided with temperature indicia which may be brought into registration with an indicator arm 128 formed on upper housing 84. A stop member 130 mounted on base 96 of upper housing 84 cooperates with an abutment wall 132 on dial 123 to limit dial rotation within one revolution.

Briefly, the operation of the invention is as follows:

When armature stem 42 is in its attracted position, movement of valve member 24 relative to valve seat 22 is under the control of the thermally responsive means acting through spring means 106, snap-action mechanism 48, and shaft means 66. Such condition is shown in the drawing wherein clicker disc 52 is in the inactive position whereby shaft means 66 maintains the valve member in the open position against the bias of spring 47. In this condition, the fuel flows from inlet 12 through valve seat 22 to outlet 14 and on to the burner.

As the bulb temperature rises, bellows 102 expands causing a downward movement of its bottom end 104. This downward movement is transmitted to clicker disc 52 through spring means 106, thrust button 58 and thrust member 56. When the space temperature reaches the value set by temperature adjusting dial 123, bellows 102 will have expanded sufficiently to actuate clicker 52 to its active position wherein clicker 52 is positioned in a reverse concavo-convex configuration to that illustrated on the drawing. Accordingly, shaft means 66 may be moved upwardly by spring 47 acting through valve stem 26 whereby valve member 24 is moved to the closed position shutting off fuel flow. Mounting bolts 86 and springs 90 serve as an override for excessive bellows expansion by allowing upper housing 84 to be lifted when excess temperature conditions are encountered.

It will be apparent that during downward movement of bottom end 104 which causes clicker disc 52 to move through the preliminary graduating movement thereof from the relaxed position to the overcenter position, upper and lower discs 114 and 108 will deflect about their central fulcrums to a stressed condition. The spring load developed by this deflection of spring means 106 is converted into clicker follow-through movement when the clicker passes through the overcenter position and no longer resists the spring means downward bias. This additional follow-through movement insures positive clicker snap-action.

Upon a subsequent decrease in bulb temperature below the value selected by temperature adjusting dial 123, bellows 102 contracts to permit clicker 52 to return to relaxed or inactive position whereby shaft means 66 again actuates valve member 24 to the open position.

The control will operate in the above described manner to maintain the desired temperature in the space to be controlled. However, upon failure of the flame at the pilot burner, armature stem 42 will be actuated to its relaxed position under the bias of spring 45 which acts through armature stem 42 and valve stem 26 to hold valve member 24 in the closed position.

When clicker 52 is in its active position, movement of armature stem 42 to its released position is not opposed by shaft means 66 which does not produce any substantial concurrent downward force on valve stem 26. However when clicker 52 is in the inactive position, shaft means 66 opposes any upward movement of valve stem 26 by means of spring 78 and plunger 80. Accordingly, in order for the flame failure cut-off to function properly, the strength of spring 45 must be sufficient to overcome the downward force of spring 78 acting on valve stem 26 through plunger 80. Should armature stem 42 be actuated to its released position to move valve stem 26 upwardly when clicker 52 is in its inactive position, spring 78 and plunger 80 serve as an override means and plunger 80 is forced upwardly within hollow upper shaft 74 by the upper end 72 of valve stem 26.

To restore the control of fuel flow to the thermally responsive means, the pilot burner is relighted and the armature stem 42 is moved to its attracted position by the usual resetting operation. Thus, valve member 24 is free for movement between open and closed positions by shaft means 66.

It is to be understood that although only one embodiment of this invention has been shown and described, the invention can be variously embodied and changes can be made in the construction and arrangement of parts without departing from the scope of the invention as defined by the appended claims.

We claim:

1. In a fluid flow control device, the combination comprising a casing having an inlet and an outlet for the flow of fluid, a valve seat therebetween, a valve member movable between open and closed positions relative to said seat for controlling the flow of fluid between said inlet and said outlet, overcenter snap-action means movable between an inactive and an active position through an overcenter position, motion transmitting means engageable between said snap-action means and said valve member for actuating said valve member between said positions thereof in response to said movement of said snap-action means, thermally responsive means aligned with said transmitting means, an element on said thermally responsive means movable in response to variations in a controlling temperature, an operative connection between said element and said snap-action means for actuating said snap-action means between the positions thereof in response to movement of said element, said operative connection being a pair of discs engageable at the peripheries thereof and spaced at the central portions thereof, each of said discs having a dimpled projection located substantially at the central portions thereof, and receptacle means in said thermally responsive element and said motion transmitting means to accommodate each of said dimpled projections respectively, whereby said operative connection is substantially a universal connection between said thermally responsive element and said motion transmitting means.

2. In a fluid flow control device, the combination comprising a casing having an inlet and an outlet for the flow of fluid, a valve seat therebetween, a valve member movable between open and closed positions relative to said seat for controlling the flow of fluid between said inlet and said outlet, overcenter snap-action means movable between an inactive and an active position through an overcenter position, motion transmitting means engageable between said snap-action means and said valve member for actuating said valve member between said positions thereof in response to said movement of said snap-action means, thermally responsive means aligned with said transmitting means, an element on said thermally responsive means movable in response to variations in a controlling temperature, an operative connection between said element and said snap-action means for actuating said snap-action means between the positions thereof in response to movement of said element, said operative connection being a pair of discs engageable at the peripheries and spaced at the central portions thereof, an axially extending annular flange at the periphery of one of said discs, receptacle means in said thermally responsive element and said motion transmitting means to accommodate each of said discs, and said annular flange being a structural member for said one disc and a barrier for radial travel of said other disc, said other disc thereby being more resilient for positive movement and follow-through of said motion transmitting means.

References Cited in the file of this patent

UNITED STATES PATENTS

| 1,972,172 | Spencer | Sept. 4, 1934 |
| 2,604,266 | Jackson | July 22, 1952 |
| 2,690,875 | Jenkins | Oct. 5, 1954 |
| 2,702,052 | Grayson | Feb. 15, 1955 |
| 2,724,409 | Coffey | Nov. 22, 1955 |
| 2,825,507 | Eskin | Mar. 4, 1958 |
| 2,857,103 | Hajny | Oct. 21, 1958 |

FOREIGN PATENTS

| 81,367 | Sweden | Sept. 4, 1934 |